US011651197B2

(12) United States Patent
Menezes et al.

(10) Patent No.: US 11,651,197 B2
(45) Date of Patent: May 16, 2023

(54) HOLISTIC SERVICE ADVISOR SYSTEM

(71) Applicant: International Business Machines Corporation, Armonk, NY (US)

(72) Inventors: Denzil Sunil Menezes, Coppell, TX (US); Endemecio Santana, Lewisville, TX (US); Biao Hao, Grapevine, TX (US); Shiju Mathai, Carrollton, TX (US)

(73) Assignee: International Business Machines Corporation, Armonk, NY (US)

(*) Notice: Subject to any disclaimer, the term of this patent is extended or adjusted under 35 U.S.C. 154(b) by 566 days.

(21) Appl. No.: 16/808,595

(22) Filed: Mar. 4, 2020

(65) Prior Publication Data
US 2021/0279555 A1 Sep. 9, 2021

(51) Int. Cl.
G06N 3/04 (2023.01)
G06N 3/047 (2023.01)
G06N 3/084 (2023.01)
G06N 20/00 (2019.01)
G06N 3/063 (2023.01)
G06N 5/045 (2023.01)

(52) U.S. Cl.
CPC .......... G06N 3/047 (2023.01); G06N 3/063 (2013.01); G06N 3/084 (2013.01); G06N 5/045 (2013.01); G06N 20/00 (2019.01)

(58) Field of Classification Search
CPC ...... G06N 20/00; G06N 5/045; G06N 3/0454; G06N 3/0472; G06N 3/063; G06N 3/02; G06N 3/08; G06N 3/084
See application file for complete search history.

(56) References Cited

U.S. PATENT DOCUMENTS

| 9,172,747 | B2 | 10/2015 | Walters | |
|---|---|---|---|---|
| 9,858,925 | B2 | 1/2018 | Gruber | |
| 10,109,297 | B2 | 10/2018 | Brown | |
| 10,136,296 | B1 | 11/2018 | Dames | |
| 10,353,906 | B2 | 7/2019 | Souche | |
| 10,417,266 | B2 | 9/2019 | Patel | |
| 2019/0034040 | A1 | 1/2019 | Shah | |
| 2019/0080236 | A1* | 3/2019 | Maruhashi | G06N 3/04 |
| 2019/0102064 | A1 | 4/2019 | Brown | |
| 2019/0317994 | A1* | 10/2019 | Singh | G06F 40/30 |
| 2020/0050942 | A1* | 2/2020 | Sun | G06N 3/006 |
| 2021/0141862 | A1* | 5/2021 | Huang | G06N 3/0445 |
| 2021/0201327 | A1* | 7/2021 | Konig | G06F 9/45558 |

OTHER PUBLICATIONS

Shah, "Problem Solving Chatbot for Data Structures", IEEE, 2018. (Year: 2018).*

(Continued)

*Primary Examiner* — Dave Misir
(74) *Attorney, Agent, or Firm* — Isaac J. Gooshaw; Jared L Montanaro

(57) ABSTRACT

A system for neural networks and virtual agents is provided. A computing device analyzes (i) one or more consumer requests and (ii) one or more underlying attributes. A computing device generates a threshold level of prediction of a response profile based on, but is not limited to, output data from the neural network. A computing device distributes the predicted response from the neural network to one or more cognitive service agents.

12 Claims, 6 Drawing Sheets

(56) References Cited

OTHER PUBLICATIONS

"Contextual Chatbots with Tensorflow", Chatbots Magazine, Posted by gk_, May 7, 2017, 13 pages, <https://chatbotsmagazine.com/contextual-chat-bots-with-tensorflow-4391749d0077>.

Burbick, M., "Genesys Delivers Predictive Routing", No Jitter, May 2, 2018, 6 pages, <https://www.nojitter.com/genesys-delivers-predictive-routing>.

Kiseleva et al., "Predicting Current User Intent with Contextual Markov Models", Research Gate, Conference paper, Dec. 2013, 9 pages, <ttps://www.researchgate.net/publication/262252837>.

Kong et al., "Predicting Search Intent Based on Pre-Search Context", SIGIR'15, Aug. 9-13, 2015, Santiago, Chile, 10 pages.

Nilsen, P., "Predict User Intent with Machine Learning (AI, Recommender Systems)", Cetrix Cloud Services, Jul. 13, 2018, 17 pages, <https://www.cetrixcloudservices.com/blog/predict-user-intent-with-machine-learning>.

Mell et al., "The NIST Definition of Cloud Computing", National Institute of Standards and Technology, U.S. Department of Commerce, Special Publication 800-145, 7 pages.

* cited by examiner

HOLISTIC SERVICE ADVISOR SYSTEM

BACKGROUND OF THE INVENTION

The present invention relates generally to the field of machine learning, and more particularly to virtual agents.

Neural networks are computing system that learn, from data analysis, how to perform tasks. In addition, neural networks include multilayer perceptron, which are a class of feedforward artificial neural networks. Multilayer perceptron consists of, at least three layers: a first layer, a hidden layer, an output layer. Multilayer perceptron operates under a supervised learning technique of backpropagation for training and is largely utilized to distinguish data that is not linearly separable.

SUMMARY

Embodiments of the present invention provide a method, system, and program product for s system of neural networks and virtual agents.

A first embodiment encompasses a method for managing a system of neural networks and virtual agents. One or more processors analyze (i) one or more consumer requests and (ii) one or more underlying attributes. One or more processors generate a threshold level of prediction of a response profile based on, but is not limited to, output data from the neural network. One or more processors distribute the predicted response from the neural network to one or more cognitive service agents.

A second embodiment encompasses a computer program product for a system of neural networks and virtual agents. The computer program product includes one or more computer-readable storage media and program instructions stored on the one or more computer-readable storage media. The program instructions include program instructions to analyze (i) one or more consumer requests and (ii) one or more underlying attributes. The program instructions include program instructions to generate a threshold level of prediction of a response profile based on, but is not limited to, output data from the neural network. The program instructions include program instructions to distribute the predicted response from the neural network to one or more cognitive service agents.

A third embodiment encompasses a computer system for managing a system for neural networks and virtual agents. The computer system includes one or more computer processors, one or more computer-readable storage medium, and program instructions stored on the computer readable storage medium for execution by at least one of the one or more processors. The computer program includes one or more computer-readable storage media and program instructions stored on the one or more computer-readable storage media. The program instructions include program instructions to analyze (i) one or more consumer requests and (ii) one or more underlying attributes. The program instructions include program instructions to generate a threshold level of prediction of a response profile based on, but is not limited to, output data from the neural network. The program instructions include program instructions to distribute the predicted response from the neural network to one or more cognitive service agents.

DETAILED DESCRIPTION

Figure 1:
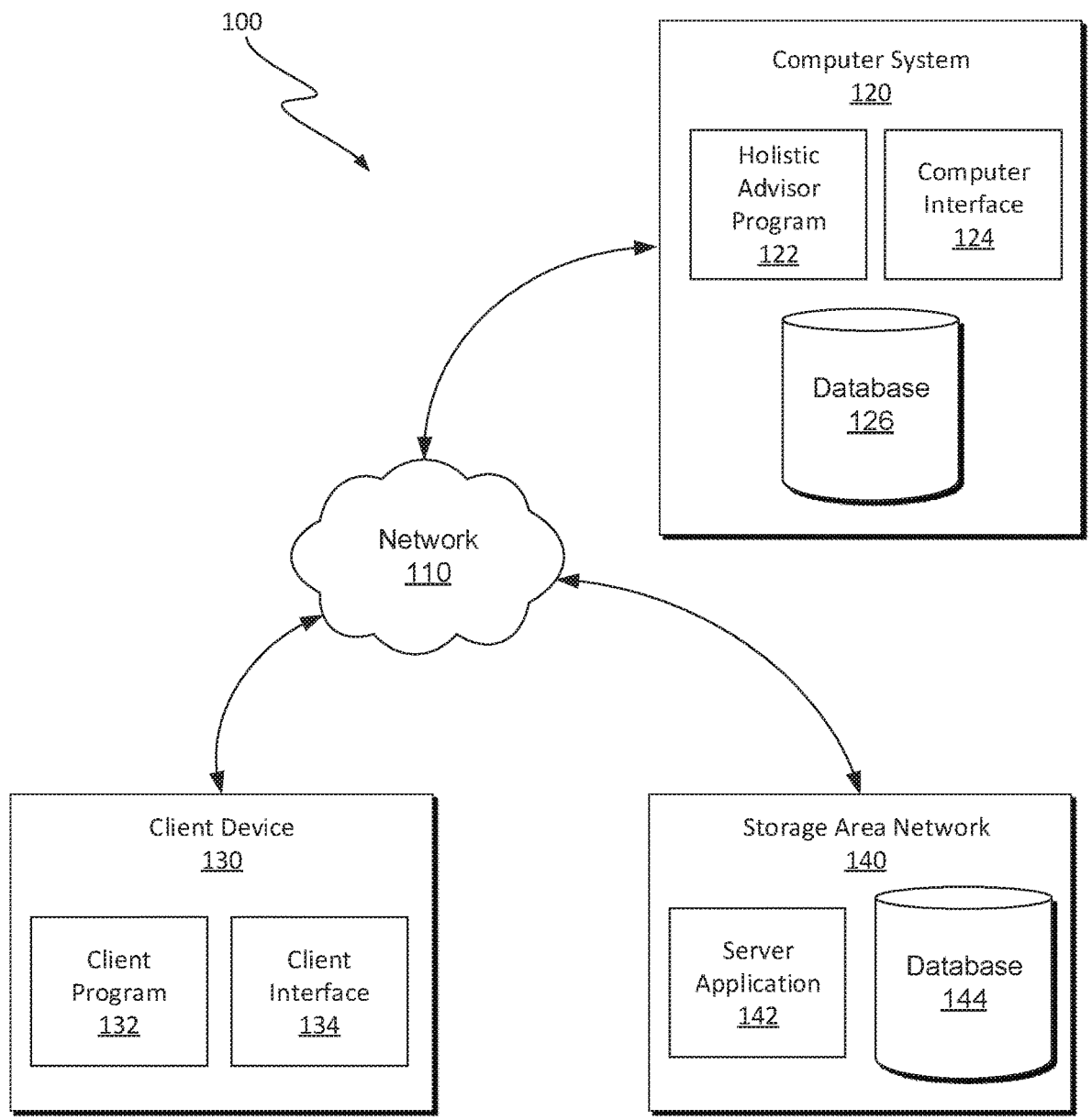
FIG. 1 is a functional block diagram illustrating a computing environment, in which a system for neural networks and virtual agents is executed, in accordance with an exemplary embodiment of the present invention.

Detailed embodiments of the present invention are disclosed herein with reference to the accompanying drawings. It is to be understood that the disclosed embodiments are merely illustrative of potential embodiments of the present invention and may take various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

While possible solutions to virtual agents that rely on machine learning for a business domain are known, these solutions may be inadequate to proactively generate a response profile associated with a consumer request. For example, a given solution may fail to proactively generate a response profile for a consumer request when the virtual agent analyzes the consumer request for an initial period. Generally, in machine learning, a weighted model may be preferable to have a high accuracy of prediction, or to have the ability to correctly predict a result of an unknown. If the neural network reactively generates a response profile when it analyzes a consumer request for an initial period, the more catastrophic and overwhelming the quality of the response profile will be. Embodiments of the present invention provide a solution that may proactively generate a response profile based on predictions of consumer request, e.g., before a given consumer request is received. Embodiments of the present invention provide a solution that predicts consumer requests by analyzing previous consumer requests and previous response profiles, as well as, underlying attributes to generate the predicted, e.g., forecasted response profile. In some embodiments, the neural network monitors consumer requests. In one embodiment, the system analyzes the consumer requests and transmits the analysis data to a neural network that sues the analysis data as a basis to arrange, at least in part, initial I/O data in a layered feedforward topology. In some embodiments, the arrangement of initial I/O data in a layered feedforward topology is based, at least in part, on an interpretation of the initial I/O data using the weights and thresholds of the parameters of the model.

Embodiments of the present invention recognize that neural network used for virtual agents generally generate I/O data. However, the I/O data may not be predictive but rather a summary of the I/O data collected from (i) consumer requests, (ii) response profiles, and (iii) underlying attributes, and therefore the corresponding I/O data generated by the neural network may not forecast any best fit answers for a response profile. Additionally, neural networks typically populate a computing device with results relating to the data collected from, and/or is generated based on, the consumer request and previous response profiles. As such, these and similar systems may, in certain circumstances, be ineffective for forecasting best fit answers when compared to other solutions. The present invention provides a more effective system for forecasting best fit answers associated with response profiles based on the current and previous consumer request and previous response profiles.

In one embodiment, holistic advisor program 122 analyzes (i) one or more consumer requests and (ii) one or more underlying attributes. Holistic advisor program 122 generates a threshold level of prediction of a response profile based on, but is not limited to, output data from the neural network. Holistic advisor program 122 distributes the predicted response from the neural network to one or more cognitive service agents.

In one embodiment, holistic advisor program 122 receives one or more consumer requests. Holistic advisor program 122 analyzes the one or more consumer requests. Holistic advisor program 122 identifies one or more topics of conversation that require user assistance. Holistic advisor program 122 retrieves one or more underlying attributes. Holistic advisor program 122 determines one or more responses to the one or more consumer requests.

In one embodiment, holistic advisor program 122 generates an initial response profile, wherein the response profile is communicated to a user. Holistic advisor program 122 analyzes one or a combination of: (i) a current consumer request, (ii) one or more underlying attributes, and (iii) one or more previous consumer requests and one or more previous underlying attributes from (a) the current user or (b) one or more previous users, wherein one or more cognitive service agents analyze the above data simultaneously. Holistic advisor program 122 receives one or more subsequent consumer requests in response to the generated response profile. In response to holistic advisor program 122 analyzing the one or more subsequent consumer requests, holistic advisor program 122 identifies whether the initial response profile answered the user's consumer request.

In one embodiment, holistic advisor program 122 distributes the one or more subsequent consumer requests to the one or more cognitive service agents. Holistic advisor program 122 determines a subsequent course of action that includes, one or a combination of: (i) generate one or more response profiles, (ii) connect the user with a live operator, or (iii) additional topics of conversation that require user assistance.

In one embodiment, holistic advisor program 122 receives the one or more consumer requests. Holistic advisor program 122 identifies one or more datasets or information that include, one or a combination of: (i) one or more response variables or (ii) one or more explanatory variables. Holistic advisor program 122 generates multilayer perceptron neural network request that includes, one or a combination of: (i) one or more response variables or (ii) one or more explanatory variables.

In one embodiment, holistic advisor program 122 arranges the one or more response variables and the one or more explanatory variables into a first layer of a neural network. Holistic advisor program 122 assigns a weight level to one or more neurons based on, the one or more corresponding explanatory variables. Holistic advisor program 122 receives a best fit answer from the neural network.

In one embodiment, holistic advisor program 122 distributes the best fit answer to one or more cognitive service agents. Holistic advisor program 122 learns to identify a pattern of features within, one or a combination of: (i) the one or more consumer requests and (ii) the one or more explanatory variables. Holistic advisor program 122 determines utilizing deep learning to generate a best fit answer for one or more subsequent consumer requests.

The present invention will now be described in detail with reference to the Figures.

FIG. 1 is a functional block diagram illustrating computing environment, generally designated 100, in accordance with an embodiment of the present invention. Computing environment 100 includes computer system 120, client device 130, and storage area network 140. Computer system 120 includes holistic advisor program 122, computer interface 124, and database 126. Client device 130 includes client program 132 and client interface 134. Storage area network (SAN) 140 includes server application 142 and database 144.

In various embodiments of the present invention, computer system 120 is a computing device that can be a standalone device, a server, a laptop computer, a tablet computer, a netbook computer, a personal computer (PC), a personal digital assistant (PDA), a smartwatch, a desktop computer or any programmable electronic device capable of executing machine readable program instructions and communications with client device 130 and SAN 140. In another embodiment, computer system 120 represents a computing system utilizing clustered computers and components to act as a single pool of seamless resources. In general, computer system 120 can be any computing device or a combination of devices with access to client device 130, SAN 140, and network 110 and is capable of executing holistic advisor program 122, computer interface 124, and database 126. Computer system 120 may include internal and external hardware components as depicted and described in further detail with respect to FIG. 6.

In this exemplary embodiment, holistic advisor program 122 and computer interface 124 are stored on computer system 120. However, in other embodiments, holistic advisor program 122 and computer interface 124 may be stored externally and accessed through a communication network, such as network 110. Network 110 can be, for example, a local area network (LAN), a wide area network (WAN) such as the Internet, or a combination of the two, and may include wired, wireless or any other connection known in the art. In general, network 110 can be any combination of connections and protocols that will support communications between computer system 120, client device 130 and SAN 140, in accordance with a desired embodiment of the present invention.

Holistic advisor program 122 is depicted in FIG. 1 for illustrative simplicity. In various embodiments of the present invention, holistic advisor program 122 represents logical operations executing on computer system 120, where computer interface 124 manages the ability to view these logical operations on computer system 120. Computer system 120 can include any number of logical operations that are managed and executed in accordance with holistic advisor program 122. In some embodiments, holistic advisor program 122 represents a cognitive AI system that processes and analyzes input and output (I/O) data. Additionally, holistic advisor program 122, when executing cognitive AI processing, operates to learn from the I/O that was analyzed and generates prediction model based, at least, on the analyzation operation. In some embodiments, holistic advisor program 122 determines whether a specific action is likely to take place and generates a digital message and communicates an alert system to one or more users of client device 130.

Computer system 120 includes computer interface 124. Computer interface 124 provides an interface between computer system 120, client device 130, and SAN 140. In some embodiments, computer interface 124 can be a graphical user interface (GUI) or a web user interface (WUI) and can display text, documents, web browser, windows, user options, application interfaces, and instructions for operation, and includes the information (such as graphic, text, and sound) that a program presents to a user and the control sequences the user employs to control the program. In some embodiments, computer system 120 accesses data communicated from client device 130 and/or SAN 140 via a client-based application that runs on computer system 120. For example, computer system 120 includes mobile application software that provides an interface between computer system 120, client device 130, and SAN 140.

In various embodiments of the present invention, client device 130 is a computing device that can be a standalone device, a server, a laptop computer, a tablet computer, a netbook computer, a personal computer (PC), a personal digital assistant (PDA), a smartwatch, a desktop computer or any programmable electronic device capable of executing machine readable program instructions and communications with computer system 120 and SAN 140. In another embodiment, computer system 120 represents a computing system utilizing clustered computers and components to act as a single pool of seamless resources. In general, computer system 120 can be any computing device or a combination of devices with access to computer system 120, SAN 140, and network 110 and is capable of executing client program 132 and client interface 134. Client device 130 may include internal and external hardware components as depicted and described in further detail with respect to FIG. 6.

Storage area network (SAN) 140 is a storage system that includes server application 142 and database 144. SAN 140 may include one or more, but is not limited to, computing devices, servers, server-clusters, web-servers, databases and storage devices. SAN 140 operates to communicate with computer system 120, client device 130, and various other computing devices (not shown) over a network, such as network 110. For example, SAN 140 communicates with holistic advisor program 122 to transfer data between, but is not limited to, computer system 120, client device 130, and various other computing devices (not shown) that are connected to network 110. SAN 140 can be any computing device or a combination of devices (not shown) that are connected to network 110. SAN 140 can be any computing device or a combination of devices that communicatively connected to a local IoT network, i.e., a network comprised of various computing devices including, but are not limited to computer system 120 and client device 130 to provide the functionality described herein. SAN 140 can include internal and external hardware components as described with respect to FIG. 6. The present invention recognizes that FIG. 1 may include any number of computing g devices, servers, databases, and/or storage devices, and the present invention is not limited to only what is depicted in FIG. 1. As such, in some embodiments, some or all of the features and functions of SAN 140 are included as apart of computer system 120, client device 130 and/or another computing device. Similarly, in some embodiments, some of the features and functions of computer system 120 are included as apart of SAN 140 and/or another computing device.

Additionally, in some embodiments, SAN 140 represents, or us part of, a cloud computing platform. Cloud computing is a model or service delivery for enabling convenient, on demand network access to shared pool of configurable computing resources (e.g., networks, network bandwidth, servers, processing, memory, storage, applications, virtual machines, and service(s) that can be rapidly provisioned and released with minimal management effort or interaction with a provider of a service. A cloud model may include characteristics such as on-demand self-service, broad network access, resource pooling, rapid elasticity, and measured service, can be represented by service models including a platform as a service (PaaS) model, an infrastructure as a service (IaaS) model; and can be implemented as various deployment models including as a private cloud, a community cloud, a public cloud, and a hybrid cloud.

In various embodiments, SAN 140 is depicted in FIG. 1 for illustrative simplicity. However, it is to be understood that, in various embodiments, SAN 140 can include any number of databases that are managed in accordance with the functionality of server application 142. In general, database 144 represents data and server application 142 represents code that provides an ability to use and modify the data. In an alternative embodiment, holistic advisor program 122 can also represent any combination of the aforementioned features, in which server application 142 has access to database 126 and/or database 144. To illustrate various aspects of the present invention, examples of server application 142 are presented in which holistic advisor program 122 represents one or more of, but is not limited to, a local IoT network and contract event monitoring system.

In some embodiments, server application 142 and database 144 are stored on SAN 140. However, in other embodiments, server application 142 and database 144 may be stored externally and accessed through a communication network, such as network 110, as discussed above.

In one embodiment of the present invention, holistic advisor program 122 defines a system for generating related datasets for one or more communications for computer system 120 that has access to customer-related data on SAN 140 and has access to customer-related data on other computer systems (e.g., various other computing devices).

In exemplary embodiments, SAN 140 represents an internet-based service for storing and transcribing electronic documents and/or datasets. In various embodiments, SAN 140 encompasses software, servers, databases, web servers, and web pages supported by software to operate and maintain an internet-based service for a cognitive service agent.

Users of computer system 120 and/or client device 130 have access to databases maintained and supported by SAN 140 via any communicative connection known in the art. One or more users have the availability to edit, change, or alter the datasets stored on SAN 140 and are accessible by any communicative connection known in the art.

Holistic advisor program 122, computer interface 124, client program 132, client interface 134, server application 142, and database 144 are depicted in FIG. 1 for illustrative simplicity. However, computer system 120, can include any number of logics and/or programs that are managed in accordance with holistic advisor program 122. In general, computer system 120 manages access to holistic advisor program 122, which represents a physical or virtual resource. In some embodiments, holistic advisor program 122 includes certain information and computer interface 124 represents program code that, when executed, enables computer system 120 to take specific action with respect to another physical resource and/or virtual resource based, at least in part on that certain information. In other words, in one such embodiments, computer interface 124 manages, at least in part, the ability of computer system 120 to take various actions with respect to one or more physical resources and/or virtual resources. In some embodiments, holistic advisor program 122 controls physical and/or virtual resources and computer interface 124 manages the ability of computer system 120 to use and modify those resources. Holistic advisor program 122 can also embody any combination of the aforementioned elements. To illustrate various aspects of the present invention, examples of holistic advisor program 122 are presented in which holistic advisor program 122 includes one or more of: a user profile, a consumer request, a cognitive artificial intelligence (AI), a multilayer perceptron neural network (MLP) request, are presented, but embodiments of holistic advisor program 122 are not limited thereto. Embodiments of the present invention recognize that holistic advisor program 122 may include other forms of transactions that are known in the art.

In some embodiments of the present invention, holistic advisor program 122 receives I/O data in the form of, I.e., is included as a part of, a consumer request from the client device 130 and various other computer systems connected over network 110, but embodiments of holistic advisor program 122 are not limited thereto. In various embodiments, holistic advisor program 122 generates a response profile based, at least, on the consumer request. The response profile comprises one or more response variables and one or more explanatory variables. In some embodiments, the response variables represent I/O data that indicate an response to the consumer request or indicates that the consumer request should be navigated towards a live operator to assist the consumer. In addition to the response variables, the explanatory variables represent a plurality of explanatory features that identify underlying attributes to the one or more response variables. The underlying attributes include one or a combination of: weather, infrastructure damage, demographics, consumer's emotion and/or personality derived from consumer request and various other virtual platforms (e.g., social media, call center, emails, etc.), recent social media interaction with business entity, consumer's interaction with systems of record (e.g., reported issues with website, reported complaints, negative experience with mobile applications, etc.), reported compliance and regulatory system issues, etc. Further, the response profile includes a description of the certainty that the response profile acknowledges the consumer request, and the response profile is characterized by the relationship of the one or more response variables and the one or more explanatory variables. In certain embodiments, computer interface 124 includes a user interface (UI) that provides a UI (e.g., graphical user interface (GUI)) to a user of computer system 120. In certain such embodiments, the UI of computer interface 124 receives I/O data from a user of client device 130 and/or various other computer systems that enables the user to interact with holistic advisor program 122 executing on computer system 120. In certain such embodiments, a UI of holistic advisor program 122 enables the user of client device 130 and/or various other computer systems to access and/or interact with computer system 120 through the authorization of the user via holistic advisor program 122. In various embodiments, a UI of holistic advisor program 122 enables the user of client device 130 to access and/or interact with computer system 120. In certain such embodiments, it is to be understood that computing environment 100 can include a plurality of computing devices without departing from the scope of the present invention.

In various embodiments of the present invention, a user of client device 130 represents one or more customers that utilizes client interface 134 executing on client device 130 to communicate with computer system 120. In some embodiments, computing environment 100 includes one or more client device 130 each individually opened and operated by one or more users. In various embodiments, the user of client device 130 communicates various forms of datasets to computer system 120. The various forms of datasets include, one or a combination of questions regarding: services, commercial products, billing, account security, general account activity, etc. In some embodiments, client program 132 receives the dataset from client interface 134 and generates a consumer request and communicates the consumer request to computer system 120.

In various embodiments, computer system 120 receives the consumer request and holistic advisor program 122 analyzes the consumer request. In various embodiments, holistic advisor program 122 represents one or more cognitive service advisor to provide assistance to consumers based, at least, on the content of the consumer request. In some embodiments, holistic advisor program 122 generates a prediction model to provide subsequent assistance to consumers based, at least, on the present consumer request.

In various embodiments of the present invention, holistic advisor program 122 receives the consumer request from client program 132. In response to receiving the consumer request, holistic advisor program 122 communicates an authorization message to the user of client device 130. In various embodiments, the authorization message expressly communicates to the user of client device to approve or deny holistic advisor program 122 access to personal data regarding the consumers account data stored on database 126, or in some embodiments, stored on database 144. In various embodiments, holistic advisor program 122 communicates the authorization message with program instructions instructing client program 122 to populate the authorization message on client interface 134 and to coach the user to select (i) approve or (ii) deny holistic advisor program 122 authorization to access personal data stored on database 126, or in some embodiments on database 144.

In various embodiments, holistic advisor program 122 analyzes each consumer request that holistic advisor program 122 receives to extract the datasets and/or information for assistance that the consumer of client device 130 is inquiring about. In various embodiments, holistic advisor program 122 identifies the dataset and/or information that the consumer is requesting. Holistic advisor program 122 access database 126 and/or database 144 to retrieve the one or more datasets and/or information. In various embodiments, holistic advisor program 122 generates a response profile that includes one or more datasets and/or information and communicates the response profile to client program 132 with program instructions instructing client program 132 to populate the profile response on client interface 134 for the user of client device 130.

In various embodiments of the present invention, holistic advisor program 122 includes one or more cognitive service agents to receive (i) datasets and/or information, and (ii) one or more consumer requests. Holistic advisor program 122 analyzes (i) the datasets and/or information, and (ii) the one or more consumer requests. In various embodiments, holistic advisor program 122 identifies the content contained within (i) the datasets and/or information, and (ii) the one or more consumer requests. As discussed above, holistic advisor program 122 identifies content that includes one or a combination of services, commercial products, billing, account security, general account activity, or various other information related to the consumer and the business entity (e.g., computer system 120), etc.

In various embodiments of the present invention, holistic advisor program 122 receives (i) the datasets and/or information, and (ii) the one or more consumer requests from client device 130, SAN 140, and/or various other computer systems, and generates an MLP request based on, but is not limited to, (i) the datasets and/or information, and (ii) the one or more consumer requests, and extracts the one or more response variables and the one or more explanatory variables. Holistic advisor program 122 arranges the I/O data into neurons in a layered feedforward topology that represents explanatory variables in an MLP request of the multilayer perceptron neural network. The neurons form a biased weighted sum of the inputs from the MLP request which forms the bases. But is not limited to, the activation function in the multilayer perceptron neural network. The neurons pass the inputs in the activation function through a transfer function to produce the output values. Holistic advisor program 122 extracts the output values from the multilayer perceptron neural network using an interpretation form of the model of I/O data with weights and thresholds as the free parameters of the model, through forward propagation of the network.

In various embodiments, holistic advisor program 122 receives an affirmative response from client program 132 that indicates that the response profile communicated to the user of client device 130 answered the user's consumer request. In some embodiments, holistic advisor program 122 receives one or more additional response profiles from client program 132 that indicates that the response profile communicated to the user of client device 130 did not answer the user's consumer request. In some embodiments, holistic advisor program 122 further analyzes (i) the consumer request, (ii) the response profile, and (iii) one or more additional consumer requests received from the user of client device 130 subsequent to the previous response profile. In various embodiments, holistic advisor program 122 receives one or more additional response profiles from client program 132. In some embodiments, holistic advisor program 122 analyzes the one or more additional response profiles and determines that the previous response profile communicated to client program 132 did not answer the user's consumer request. In various embodiments, holistic advisor program 122 generates an MLP request and utilizes (i) the neural network and (ii) the one or more cognitive entities to generate, at least, a second response profile. In one embodiment and example, holistic advisor program 122 receives one or more additional consumer requests that communicate that holistic advisor program 122 retrieved the incorrect user profile data. Holistic advisor program 122 analyzes the one or more additional response profiles and determines that the data retrieved in the initial responder profile did not answer the user's initial consumer request. In response to determining that holistic advisor program 122 did not retrieve the correct data, holistic advisor program 122 generates an MKP request and utilizes (i) the neural network and (ii) the one or more cognitive entities to generate, at least, a second response profile.

In various embodiments, holistic advisor program 122 identifies whether or not the response profile answered the user's consumer request. If, holistic advisor program 122 determines that the response profile answered the user's consumer request holistic advisor program 122 distributes this information to one or more cognitive service agents for machine learning purposes. In various embodiments, holistic advisor program 122 retrieves the data that includes (i) the response profile, (ii) the consumer request, and (iii) the underlying attributes associated with the consumer request. Holistic advisor program 122 generates an MLP request utilizing a neural network and arranges the data in the neurons in the layered topology.

In some embodiments, holistic advisor program 122 monitors the neurons in the neural network, as each input connects to neurons between, at least, (i) a first layer, (ii) one or more hidden layers, and (iii) a second layer. Additionally, the activation function of the neural network comprises, at least, (i) a linear function and (ii) a non-linear function. One having ordinary skill in the art would understand that the activation function operates within the linear function and non-linear function. Additionally, one having ordinary skill in the art would understand that the output data reflects the change in the response variables from the input to the output of the MLP.

In various embodiments, holistic advisor program 122 includes a convolutional neural network (CNN), wherein, the CNN comprises I/O data, as well as multiple hidden layers of neurons (i.e., RELU layer). Holistic advisor program 122 analyzes (i) the output data of the multilayer perceptron neural network (MLP) and (ii) the change in the explanatory variables output. Holistic advisor program 122 generates a best fit answer for each individualized consumer request based on, but is not limited to, (i) the output data from the MLP and (ii) the change in the explanatory variables from the MLP. Further holistic advisor program 122 determines which best fit answer to utilize when communicating a response profile to a user of client device 130.

In one embodiment and example, holistic advisor program 122 receives I/O data that represents at least a portion of an MLP request. Holistic advisor program 122 identifies the one or more response variables and the one or more explanatory variables from the (i) the datasets and/or information, (ii) the one or more consumer requests, (iii) the underlying attributes, and (iv) the one or more additional consumer requests. Holistic advisor program 122 arranges the I/O data into neurons in the first layer of the multilayer perceptron neural network based on, but is not limited to, the MLP request. The I/O data is then transformed through the activation function in the neural network, wherein, the weights and thresholds are connected from, at least, the first layer to a second layer. Embodiments of the present invention are not limited to the first layer and second layer, additionally, embodiments of the invention may contain a plurality within the multilayer perceptron neural network. The MLP learns, within the perceptron, by changing the weights after each piece of data is processed, based on the amount of error in the output compared with the expected result. Further, the MLP generates a scaled numeric value based on the input, which is based, at least, on the (i) the response variables and (ii) the explanatory variables of the MLP request. The MLP applies word embedding (e.g., Word2vec, natural language processing, speech to text, etc.) to transform a natural language term into one or more numeric variables. Additionally, the MLP applies binary coding to the one or more numeric variables to generate a plurality of scaled number variables. The scaled numeric variables represent the change in the explanatory variables as the output of the MLP. Holistic advisor program 122 receives the scaled numeric variables (e.g., change in the explanatory variables) and analyzes the change in the data. Holistic advisor program 122 determines whether to apply the data to a linear regression profile or a non-linear regression profile based on, but is not limited to, the change in the explanatory variables. In various embodiments, holistic advisor program 122 analyzes the change in the explanatory variables. In some embodiments, holistic advisor program 122 identifies that the change in the explanatory variables communicates that an identical or similar response profile had been communicated to a user in subsequent communications and did not answer the user's consumer request. In response to this identification, holistic advisor program 122 determines that the data should progress through another layer in the neural network. In some embodiments, holistic advisor program 122 identifies that the change in the explanatory variables communicates that an identical or similar response profile had been communicated to a user in subsequent communications and did answer the user's consumer request. In response to this identification, holistic advisor program 122 determines that this data represents the best fit answer to the user's consumer request, and holistic advisor program 122 generates a response profile based on, but is not limited to, the best fit answer. Holistic advisor program 122 monitors the regression profile generated by the output of the MLP. Holistic advisor program 122 analyzes the data and determines whether based on, but is not limited to, the predicted projection of the regression profile, whether the generated best fit answer will answer the user's consumer request. Holistic advisor program 122 communicates the generated best fit answer to the various cognitive service agents for further analyzation and use when communicating with one or more users of client device 130. Holistic advisor program 122 stores the data from (i) the output of the MLP and (ii) the regression profile on database 126 and/or database 144.

Figure 2:
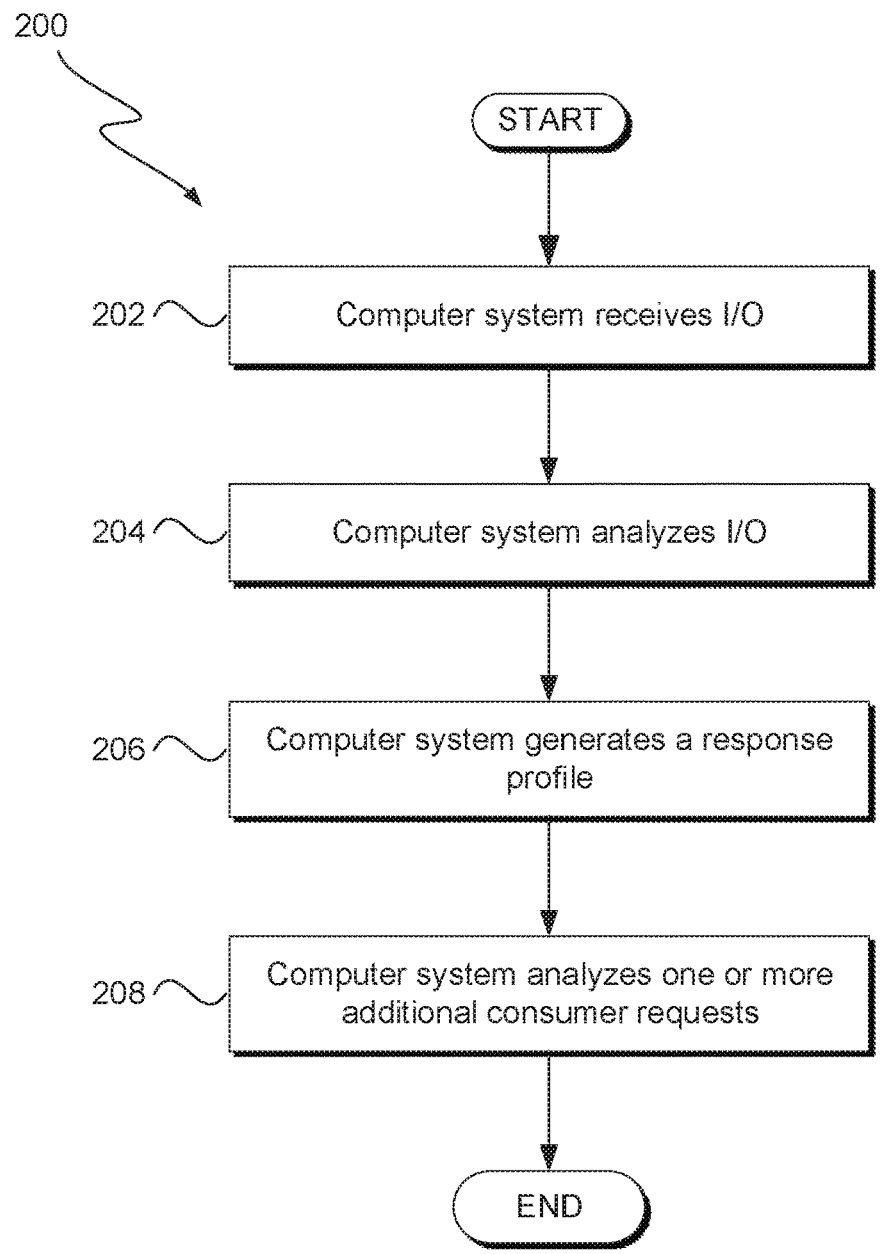
FIG. 2 illustrates operational processes of executing a system for neural networks and virtual agents, on a computing device within the environment of FIG. 1, in accordance with an exemplary embodiment of the present invention.

FIG. 2 is a flowchart, 200, depicting operations of holistic advisor program 122 in computing environment 100, in accordance with an illustrative embodiment of the present invention. FIG. 2 also represents certain interactions between holistic advisor program 122 and client program 132. In some embodiments, the operations depicted in FIG. 2 incorporate the output of certain logical operations of holistic advisor program 122 executing on computer system 120. It should be appreciated that FIG. 2 provides an illustration of one implementation and does not imply any limitations with regard to the environments in which different embodiments may be implemented. Many modifications to the depicted environment may be made. In one embodiment, the series operations depicted in FIG. 2 can be performed in any order. In another embodiment, the series of operations, depicted in FIG. 2, can be performed simultaneously. Additionally, the series of operations, depicted in FIG. 2, can be terminated at any operation. In addition to the features previously mentioned, any operations, depicted in FIG. 2, can be resumed at any time.

In operation 202, holistic advisor program 122 receives I/O data from client device 130 and SAN 140. In various embodiments, the I/O data includes, one or a combination of: (i) one or more consumer requests, (ii) one or more underlying attributes, and (iii) one or more best fit answers. In some embodiments, holistic advisor program 122 receives one or more consumer requests from a user of client device 130, wherein the consumer requests represent topics of conversation that include one or a combination of: services, commercial products, billing, account security, general account activity, or various other information related to the consumer and the business entity (e.g., computer system 120).

In operation 204, holistic advisor program 122 analyzes the one or more consumer requests. In various embodiments, holistic advisor program 122 identifies the topic of conversation that the user of client device 130 wishes to pursue. In various embodiments, holistic advisor program 122 accesses the underlying attributes data and further analyzes that data. Holistic advisor program 122 determines based on, but is not limited to, (i) the one or more consumer requests and (i) the underlying attributes, a response to the question inquired by the user of client device 130.

In operation 206, holistic advisor program 122 generates a response profile and communicates the response profile to client program 132 with program instructions instructing client program 132 to populate the response profile on client interface 134. In various embodiments of the present invention, as discussed above, holistic advisor program 122 includes one or more cognitive service agents. In various embodiments, the cognitive service agents generate the response profile based on, but is not limited to, (i) the current consumer request, (ii) the underlying attributes, and (iii) previous consumer requests and the underlying attributes from either (a) the same user or (b) one or more previous users. The cognitive service agents analyze various previously received consumer requests and the subsequent previous communicated response profiles and generate a response profile based on, but is not limited to, the previous consumer requests and previous response profiles. In various embodiments, holistic advisor program 122 communicates the response profile based on, but is not limited to, the data analyzed in FIG. 2.

In operation 208, holistic advisor program 122 analyzes one or more additional consumer requests from client device 130 subsequent to holistic advisor program 122 communicating the response profile to client device 130. In various embodiments, holistic advisor program 122 receives one or more additional consumer requests subsequent to holistic advisor program 122 communicating the response profile to client device 130. Holistic advisor program 122 analyzes the one or more additional consumer requests to identify whether the response profile answered the user's question proposed in the initial consumer request.

In various embodiments of the present invention, holistic advisor program 122 identifies that the initial response profile answered the users' question proposed in the initial consumer request. Holistic advisor program 122 stores this information on database 126 and/or database 144 and distributes the information that the initial response profile answered the initial consumer request. Additionally, holistic advisor program 122 further analyzes the one or more additional consumer requests to determine if the user wishes (i) to receive additional response profiles, (ii) to communicate with a live operator, or (iii) requires various other assistance that holistic advisor program 122 can assist with.

In various embodiments of the present invention, holistic advisor program 122 identifies that the initial response profile partially answered the user's question proposed in the initial consumer request. Holistic advisor program 122 stores this information on database 126 and/or database 144 and distributes the information that the initial response profile partially answered the initial consumer request. Additionally, holistic advisor program 122 further analyzes the one or more additional consumer requests to determine which portion of the initial response profile answered the user's consumer request and which portion of the initial response profile did not answer the user's consumer request. In various embodiments of the present invention, holistic advisor program 122 analyzes the consumer request or one or more additional requests and determines based on, but is not limited to, the content the user of client device 130 communicates to holistic advisor program 122, whether the response profile generated by holistic advisor program 122 answered the consumer request. In one embodiment and example, holistic advisor program 122 determines that the response profile answered a portion (e.g., one out of two of the user's proposed questions in the consumer request). Holistic advisor program 122 further determines which question in the additional consumer request was answered based on, but is not limited to, the content received in the additional consumer request. In various embodiments, holistic advisor program 122 distributes the portion of the consumer request that was not answered by the initial response request to the various cognitive service agents. In various embodiments, the various cognitive service agents analyze (i) the unanswered portion of the consumer request, (ii) the initial response profile, and (iii) previous consumer requests and the underlying attributes from either (a) the same user or (b) one or more previous users. In various embodiments, the collective cognitive service agents analyze various previously received consumer requests and the subsequent previous communicated response profiles to determine a response profile that will answer the initial consumer request. In various embodiments, holistic advisor program 122 collects the data from the cognitive service agents and generates a response profile and communicates the response profile to client device 130. In various embodiments, holistic advisor program 122 actively monitors for additional consumer request subsequent to the, at least, second response profile. In various embodiments, holistic advisor program 122 receives an additional consumer request and analyzes the consumer request. In some embodiments, holistic advisor program 122 determines to refer the user of client device 130 to a live operator for assistance based on, but is not limited to, the analyzation of one or more subsequent consumer requests after, at least, the second response profile.

Figure 3:
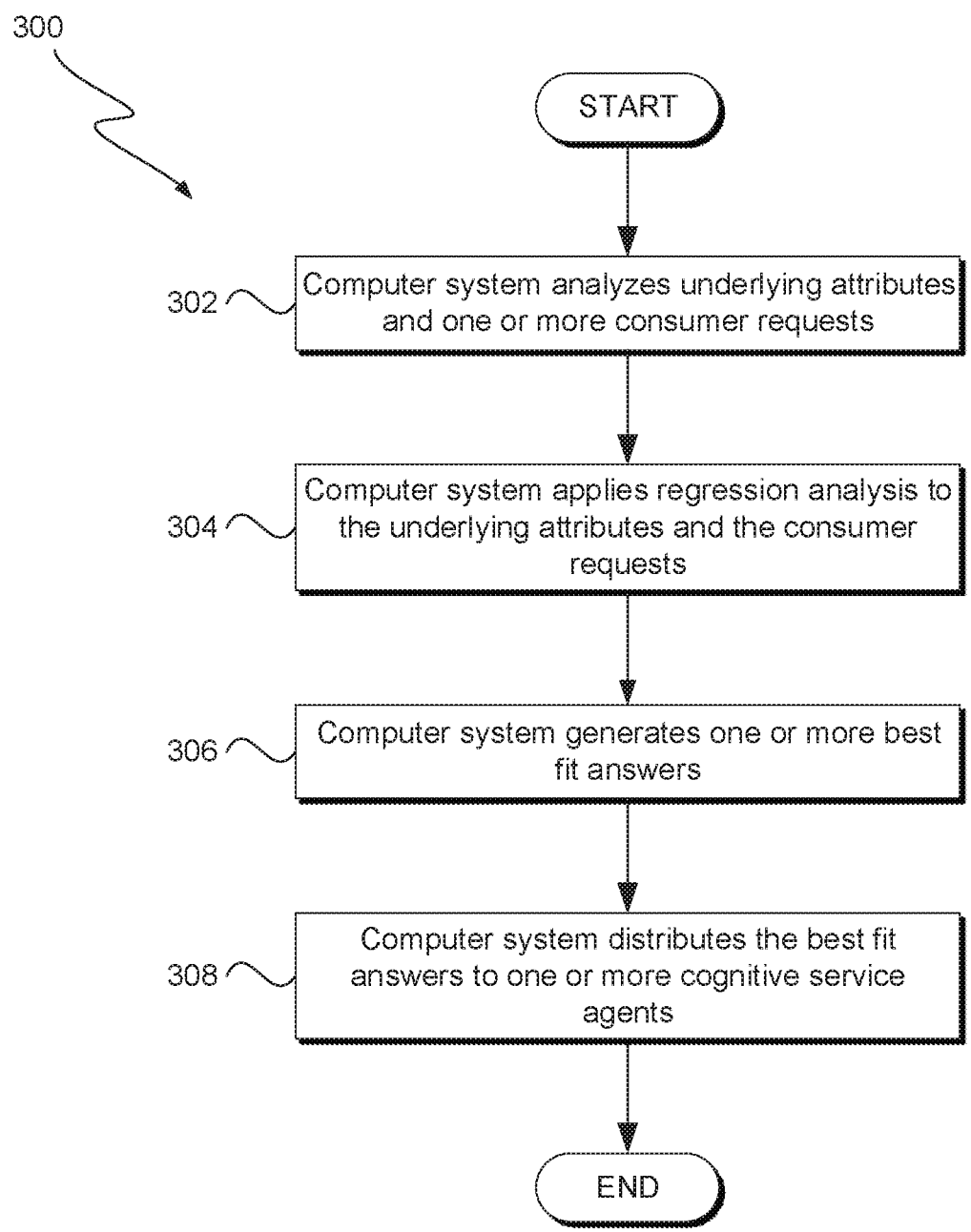
FIG. 3 illustrates operational processes of executing a system for neural networks and virtual agents, on a computing device within the environment of FIG. 1, in accordance with an exemplary embodiment of the present invention.

FIG. 3 is a flowchart depicting operations for generating, modifying, leveraging, and/or executing a multilayer perceptron neural network for computing environment 100, in accordance with an illustrative embodiment of the present invention. More specifically, in this embodiment, FIG. 3, depicts overall operations, 300, of holistic advisor program 122 on computer system 120. In some embodiments, some or all of the operations depicted in FIG. 3 represent logical operations of the one or more cognitive service agents executing within holistic advisor program 122 on computer system 120. Further, operations 300 can include a portion or all of combined overall operations of 200. In various embodiments, the series of operations 300, can be performed simultaneously with operations 200. It should be appreciated that FIG. 3 provides an illustration of one implementation and does not imply any limitations with regard to the environments in which different embodiments may be implemented. Many modifications to the depicted environment may be made. In one embodiment, the series of operations depicted in FIG. 3 can be performed in any order. In another the series of operation, depicted in FIG. 3, can be performed simultaneously. Additionally, the series of operations, depicted in FIG. 3, can be terminated at any operation. In addition to the features previously mentioned, any operations, depicted in FIG. 3, can be resumed at any time.

In operation 302, holistic advisor program 122 receives data, as recognized above, from client device 130 and SAN 140 over network 110. The data my include (i) the one or more response variables (e.g., one or more consumer requests) and (ii) the one or more explanatory variables (e.g., underlying attributes) of the MLP request. Holistic advisor program 122 analyzes the data (e.g., response variables and the explanatory variables). Holistic advisor program 122 prepares the analyzed data to be placed in the multilayer perceptron layered feedforward topology neural network.

In operation 304, holistic advisor program 122 arranges the data in neurons located on the multilayer perceptron layered feedforward topology neural network. In various embodiments, holistic advisor program 122 arranges the data in, at least, a first layer. The input data in the first layer of the MLP is weighted by the explanatory variables of the MLP request. In an alternative embodiment, holistic advisor program 122 arranges the data in neurons in, at least, a first layer of the multilayer perceptron layered feedforward topology neural network. As one having ordinary skill in the art would understand, the MLP combines the input variables with the one or more weighted sums, and the input variables are fed through the net input function and are summed. Holistic advisor program 122 retrieves the net input function sum. In one embodiment, holistic advisor program 122 analyzes the net input function and distributes the net input function (e.g., proposed best fit answer for a consumer request) to the collective cognitive service agents for analysis. In various embodiments, the cognitive service agents determine whether based, on the value produced form the net input, if the input-weight variables should progress through another layer (e.g., to determine whether the proposed best fit answer will answer the consumer request). In various embodiments, holistic advisor program 122 determines that the input-weight variables should pass through, at least, one or more layer. In some embodiments, holistic advisor program 122 prepares the input-weight variables and places this data into the neurons of the, at least, one more later, wherein the input-weight variables traverse the same calculation, as mentioned above. Holistic advisor program 122 retrieves the input-weight variables from the, at least, one more layer and further analyzes the input-weight variables (e.g., the data). In some embodiments, holistic advisor program 122 determines that the input-weight variables from the, at least, first layer are sufficient and holistic advisor program 122 stores the data on database 126 and/or database 144. The layers in the neural network function to provide deep learning abilities for holistic advisor program 122 and are leveraged to identify a pattern of features in the, at least, (i) one or more consumer requests and (ii) one or more explanatory variables.

In various embodiments as depicted in FIG. 3, holistic advisor program 122 arranges the data in neurons of the MLP and retrieves the one or more output variables as a method of deep learning, and is leveraged to identify a pattern of features in the, at least, explanatory variables. In various embodiments, the MPL connects the output of each respective layer to a neuron of, at least, another layer to generate a depth of representation of the initial data arranged in the neurons of the first layer of the MLP. As one having ordinary skill in the art would understand, in certain embodiments, the deep-learning neural networks are configured and operate such that each layer in the MLP represents a distinct set of features based on the output of the previous layer. Additionally, one having ordinary skill in the art understand that as data advances further through the MLP, the ability of a given layer to recognize more complex features increases, resulting in modeling of almost arbitrary complexity through the addition of multiple hidden layers.

In operation 306, holistic advisor program 122 retrieves the final output (e.g., the generated best fit answer to, at least, the consumer request) of the, at least, last layer. The final output data is determined to be the output data from the last layer based, at least, on the determination of holistic advisor program 122 that the input function value did not need to advance to another layer. In one embodiment, holistic advisor program 122 stores the data final output data on database 126 and/or database 144. In various embodiments, holistic advisor program 122 distributes the final output data to the cognitive service agents for analysis (operation 308). In various embodiments, the cognitive service agents analyze the best fit answer and, through machine learning, utilize this best fit answer for subsequent consumer requests. In various embodiments, holistic advisor program 122 utilizes the final output data (e.g., best fit answer) to generate a response profile to, at least, one consumer request, as recognized above.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
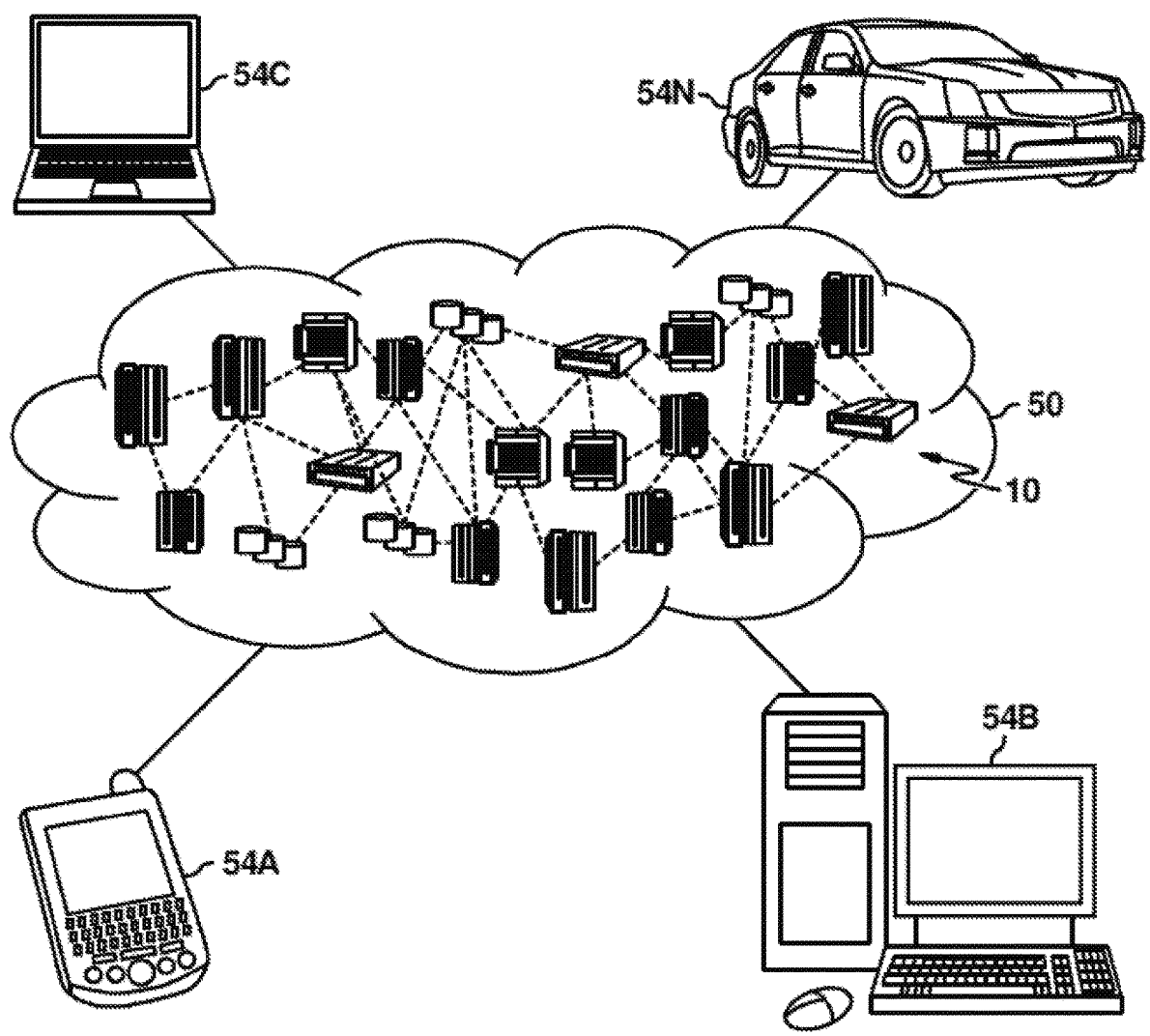
FIG. 4 depicts a cloud computing environment according to at least one embodiment of the present invention.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
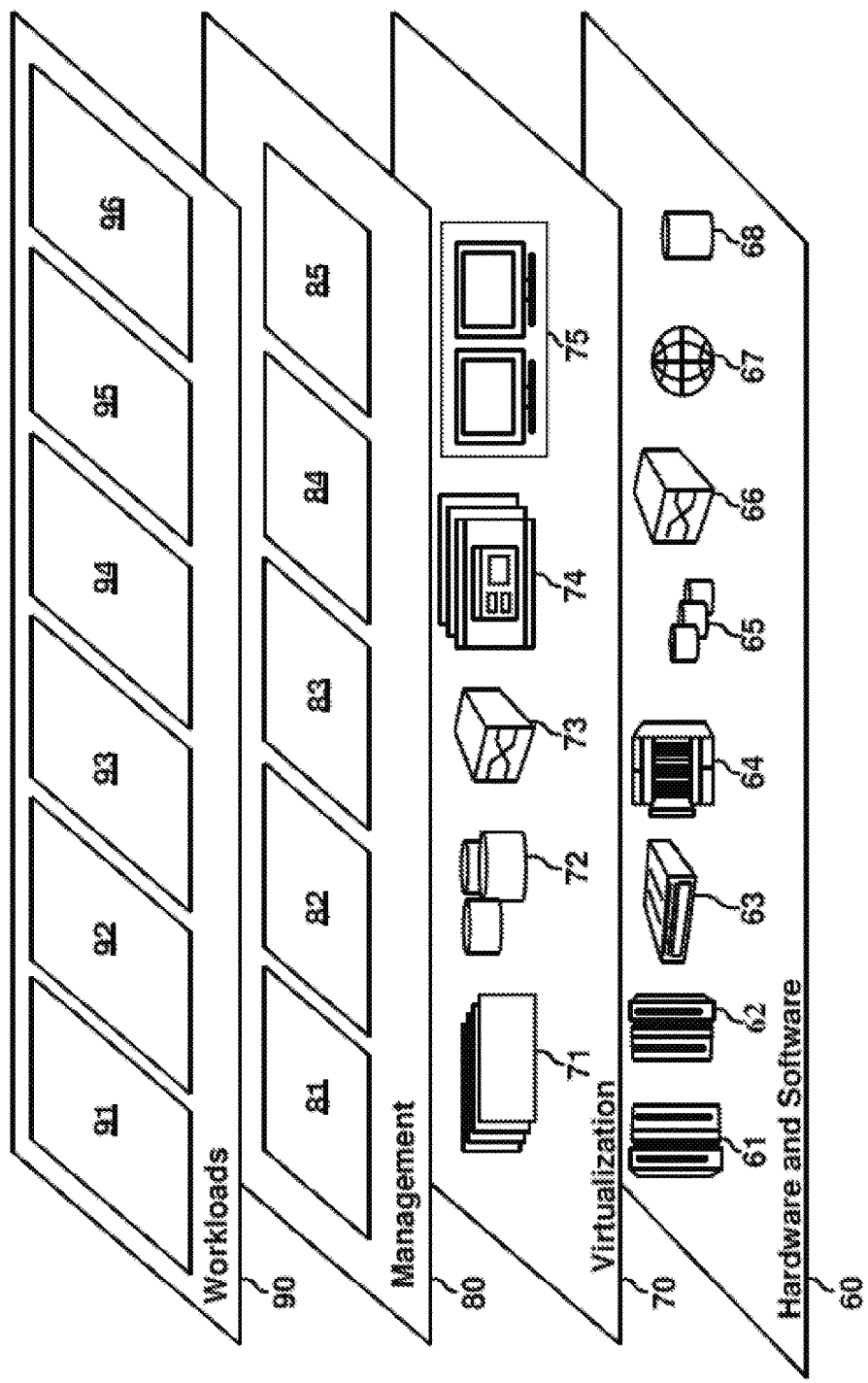
FIG. 5 depicts abstraction model layers according to at least on embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and providing soothing output 96.

Figure 6:
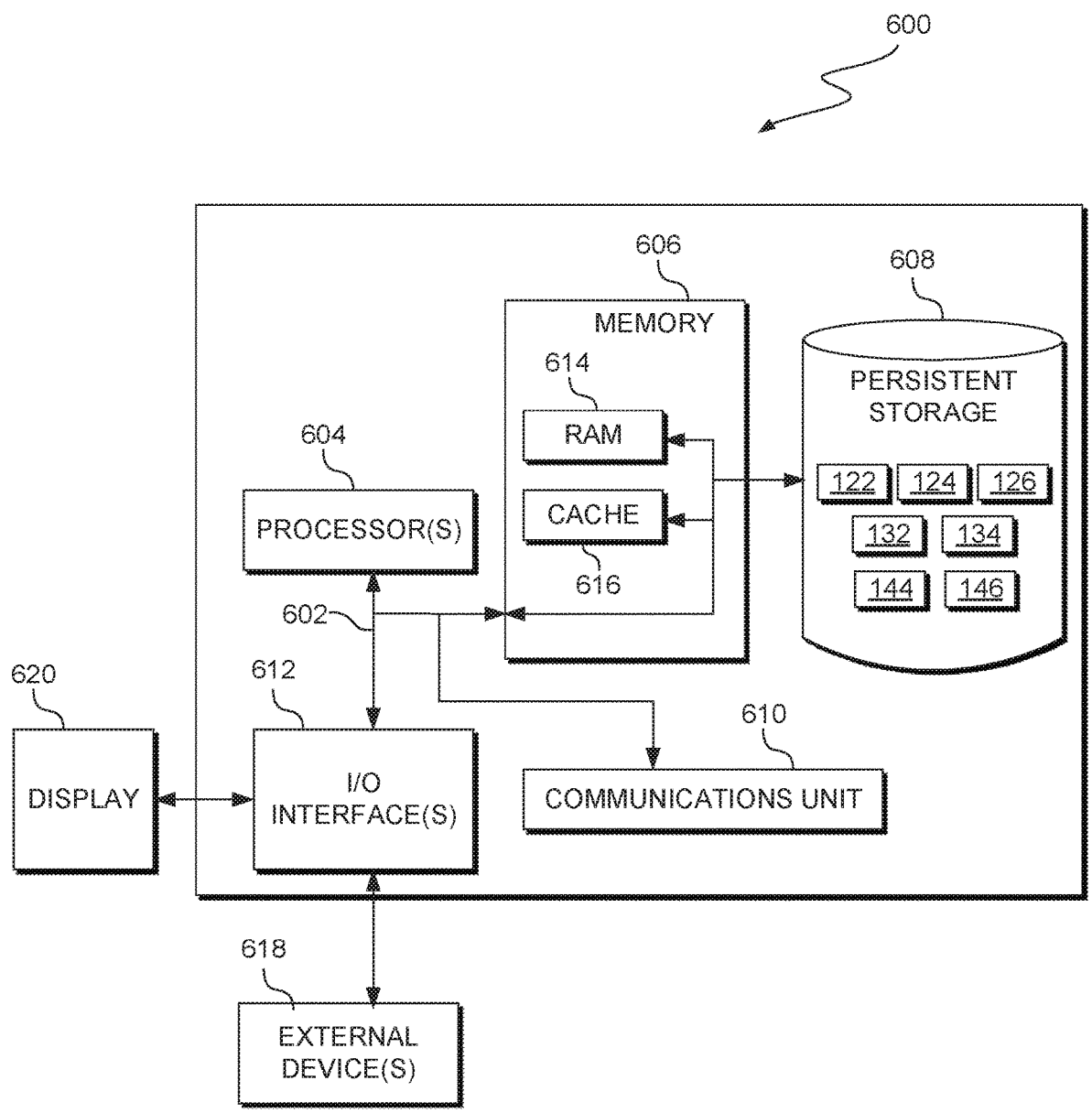
FIG. 6 is a block diagram of components of one or more computing devices within the computing environment depicted of FIG. 1, in accordance with an embodiment of the present invention.

FIG. 6 depicts a block diagram, 600, of components of computer system 120, client device 130, and SAN 140, in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Computer system 120, client device 130, and SAN 140 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 614 and cache memory 616. In general, memory 606 can include any suitable volatile or non-volatile computer-readable storage media.

Holistic advisor program 122, computer interface 124, database 16, client program 132, client interface 134, server application 142, and database 144 are stored in persistent storage 608 for execution and/or access by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer-readable storage medium that is also part of persistent storage 608.

Communications unit 610, in these examples, provides for communications with other data processing systems or devices, including resources of network 110. In these examples, communications unit 610 includes one or more network interface cards. Communications unit 610 may provide communications through the use of either or both physical and wireless communications links. Holistic advisor program 122, computer interface 124, database 16, client program 132, client interface 134, server application 142, and database 144 may be downloaded to persistent storage 608 through communications unit 610.

I/O interface(s) 612 allows for input and output of data with other devices that may be connected to computer system 120, client deice 130, and SAN 140. For example, I/O interface 612 may provide a connection to external devices 618 such as a keyboard, keypad, a touch screen, and/or some other suitable input device. External devices 618 can also include portable computer-readable storage media such as, for example, thumb drives, portable optical or magnetic disks, and memory cards. Software and data used to practice embodiments of the present invention, e.g., Holistic advisor program 122, computer interface 124, database 16, client program 132, client interface 134, server application 142, and database 144, can be stored on such portable computer-readable storage media and can be loaded onto persistent storage 608 via I/O interface(s) 612. I/O interface(s) 612 also connect to a display 620.

Display 620 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) such as, for example, "Smalltalk" and the like may be subject to trademark rights in various jurisdictions throughout the world and are used here only in reference to the products or services properly denominated by the marks to the extent that such trademark rights may exist.

What is claimed is:

1. A computer-implemented method comprising:
    identifying, by one or more processors, one or more response variables and one or more explanatory variables associated with one or more previous consumer requests that required user assistance, wherein the one or more explanatory variables represent one or more explanatory features that identify respective underlying attributes to the one or more response variables;
    arranging, by the one or more processors, the one or more response variables and the one or more explanatory variables into a first layer of a neural network;
    assigning, by the one or more processors, a weight level to one or more neurons of the neural network corresponding to the one or more explanatory variables;
    generating, by the one or more processors, a predictive response profile based, at least in part, on output data from the neural network, wherein the predictive response profile comprises one or more predicted responses to one or more predicted consumer requests;
    receiving, by the one or more processors, a best fit answer to a predicted consumer request, wherein the best fit answer is a predicted response from the predictive response profile; and
    distributing, by the one or more processors, the best fit answer to the predicted consumer request to one or more cognitive service agents.

2. The computer-implemented method of claim 1, the method further comprising:
    generating, by the one or more computer processors, an initial response profile, wherein the initial response profile is communicated to a user;
    receiving, by the one or more computer processors, one or more subsequent consumer requests in response to the generated initial response profile;
    analyzing, by the one or more computer processors, the one or more subsequent consumer requests, wherein the one or more cognitive service agents actively learn utilising machine learning; and
    in response to analyzing the one or more subsequent consumer requests, identifying, by the one or more computer processors, whether the initial response profile answered a current consumer request.

3. The computer-implemented method of claim 2, the method further comprising:
    distributing, by the one or more computer processors, the one or more subsequent consumer requests to the one or more cognitive service agents; and
    determining, by the one or more computer processors, a subsequent course of action that includes, one or a combination of: (i) generate one or more response profiles, (ii) connect the user with a live operator, or (iii) additional topics of conversation that require user assistance.

4. The computer-implemented method of claim 1, the method further comprising:
    learning, by the one or more computer processors, to identify a pattern of features within, one or a combination of: (i) the one or more previous consumer requests and (ii) the one or more explanatory variables; and
    determining, by the one or more computer processors, to generate the best fit answer utilising deep learning for one or more subsequent consumer requests.

5. A computer program product, the computer program product comprising:
    one or more computer-readable storage media and program instructions stored on the one or more computer-readable storage media, the program instructions comprising:
        program instructions to identify one or more response variables and one or more explanatory variables associated with one or more previous consumer requests that required user assistance, wherein the one or more explanatory variables represent one or more explanatory features that identify respective underlying attributes to the one or more response variables;
        program instructions to arrange the one or more response variables and the one or more explanatory variables into a first layer of a neural network;
        program instructions to assign a weight level to one or more neurons of the neural network corresponding to the one or more explanatory variables;
        program instructions to generate a predictive response profile based, at least in part, on output data from the neural network, wherein the predicted response profile comprises one or more predicted responses to one or more predicted consumer requests;
        program instructions to receive a best fit answer to a predicted consumer request, wherein the best fit answer is a predicted response from the predictive response profile; and
        program instructions to distribute the best fit answer to the predicted consumer request to one or more cognitive service agents.

6. The computer program product of claim 5, the program instructions further comprising:
    program instructions to generate an initial response profile, wherein the initial response profile is communicated to a user;
    program instructions to receive one or more subsequent consumer requests in response to the generated initial response profile;
    program instructions to analyze the one or more subsequent consumer requests, wherein the one or more cognitive service agents actively learn utilising machine learning; and
    in response to analyzing the one or more subsequent consumer requests, program instructions to identify whether the initial response profile answered a current consumer request.

7. The computer program product of claim 6, the program instructions further comprising:
    program instructions to distribute the one or more subsequent consumer requests to the one or more cognitive service agents; and program instructions to determine a subsequent course of action that includes, one or a combination of: (i) generate one or more response profiles, (ii) connect the user with a live operator, or (iii) additional topics of conversation that require user assistance.

8. The computer program product of claim 5, the computer program product comprising:

program instructions to learn to identify a pattern of features within, one or a combination of: (i) the one or more previous consumer requests and (ii) the one or more explanatory variables; and program instructions to determine to generate the best fit answer utilizing deep learning for one or more subsequent consumer requests.

9. A computer system, the computer system comprising:

one or more computer processors;

one or more computer readable storage medium; and program instructions stored on the computer readable storage medium for execution by at least one of the one or more processors, the program instructions comprising:

program instructions to identify one or more response variables and one or more explanatory variables associated with one or more previous consumer requests that required user assistance, wherein the one or more explanatory variables represent one or more explanatory features that identify respective underlying attributes to the one or more response variables;

program instructions to arrange the one or more response variables and the one or more explanatory variables into a first layer of a neural network;

program instructions to assign a weight level to one or more neurons of the neural network corresponding to the one or more explanatory variables;

program instructions to generate a predictive response profile based, at least in part, on output data from the neural network, wherein the predicted response profile comprises one or more predicted responses to one or more predicted consumer requests;

program instructions to receive a best fit answer to a predicted consumer request, wherein the best fit answer is a predicted response from the predictive response profile; and program instructions to distribute the best fit answer to the predicted consumer request to one or more cognitive service agents.

10. The computer system of claim 9, the program instructions further comprising:

program instructions to generate an initial response profile, wherein the initial response profile is communicated to a user;

program instructions to receive one or more subsequent consumer requests in response to the generated initial response profile;

program instructions to analyze the one or more subsequent consumer requests, wherein the one or more cognitive service agents actively learn utilising machine learning; and in response to analyzing the one or more subsequent consumer requests, program instructions to identify whether the initial response profile answered a current consumer request.

11. The computer system of claim 10, the program instructions further comprising:

program instructions to distribute the one or more subsequent consumer requests to the one or more cognitive service agents; and program instructions to determine a subsequent course of action that includes, one or a combination of: (i) generate one or more response profiles, (ii) connect the user with a live operator, or (iii) additional topics of conversation that require user assistance.

12. The computer system of claim 9, the program instructions further comprising:

program instructions to learn to identify a pattern of features within, one or a combination of: (i) the one or more previous consumer requests and (ii) the one or more explanatory variables; and program instructions to determine to generate the best fit answer utilizing deep learning for one or more subsequent consumer requests.

* * * * *